US011699079B2

(12) United States Patent
Spanias et al.

(10) Patent No.: US 11,699,079 B2
(45) Date of Patent: Jul. 11, 2023

(54) SYSTEMS AND METHODS FOR TIME SERIES ANALYSIS USING ATTENTION MODELS

(71) Applicants: Andreas Spanias, Tempe, AZ (US); Huan Song, Tempe, AZ (US); Jayaraman J. Thiagarajan, Milpitas, CA (US); Deepta Rajan, Bellevue, WA (US)

(72) Inventors: Andreas Spanias, Tempe, AZ (US); Huan Song, Tempe, AZ (US); Jayaraman J. Thiagarajan, Milpitas, CA (US); Deepta Rajan, Bellevue, WA (US)

(73) Assignees: Arizona Board of Regents On Behalf Of Arizona State University, Scottsdale, AZ (US); Lawrence Livermore National Security, LLC, Livermore, CA (US)

( * ) Notice: Subject to any disclaimer, the term of this patent is extended or adjusted under 35 U.S.C. 154(b) by 517 days.

(21) Appl. No.: 16/748,985

(22) Filed: Jan. 22, 2020

(65) Prior Publication Data
US 2020/0236402 A1    Jul. 23, 2020

Related U.S. Application Data

(60) Provisional application No. 62/795,176, filed on Jan. 22, 2019.

(51) Int. Cl.
*G06N 3/082*    (2023.01)
*G06N 3/04*    (2023.01)
(Continued)

(52) U.S. Cl.
CPC ........... *G06N 3/082* (2013.01); *G06F 18/213* (2023.01); *G06N 3/04* (2013.01); *G06N 3/048* (2023.01);
(Continued)

(58) Field of Classification Search
CPC .......... G06N 3/08; G06N 3/04; G06N 3/0481; G06K 9/00496; G06K 9/6232; G06K 9/6267
See application file for complete search history.

(56) References Cited

U.S. PATENT DOCUMENTS 9,461,676 B2    10/2016    Santucci et al.
9,507,011 B2    11/2016    Zhang et al.
(Continued)

OTHER PUBLICATIONS

Rajan, D., et al. Attend and Diagnose: Clinical Time Series Analysis using Attention Models. No. LLNL-CONF-738533. Lawrence Livermore National Lab.(LLNL), Livermore, CA (United States), 2017. (Year: 2017).*
(Continued)

*Primary Examiner* — Eric Nilsson
(74) *Attorney, Agent, or Firm* — Snell & Wilmer L.L.P.

(57) ABSTRACT

A system for time series analysis using attention models is disclosed. The system may capture dependencies across different variables through input embedding and may map the order of a sample appearance to a randomized lookup table via positional encoding. The system may capture capturing dependencies within a single sequence through a self-attention mechanism and determine a range of dependency to consider for each position being analyzed. The system may obtain an attention weighting to other positions in the sequence through computation of an inner product and utilize the attention weighting to acquire a vector representation for a position and mask the sequence to enable causality. The system may employ a dense interpolation
(Continued)

technique for encoding partial temporal ordering to obtain a single vector representation and a linear layer to obtain logits from the single vector representation. The system may use a type dependent final prediction layer.

12 Claims, 2 Drawing Sheets

(51) Int. Cl.
   *G06N 3/08*      (2023.01)
   *G06F 18/213*    (2023.01)
   *G06N 3/048*     (2023.01)
   *G06F 18/24*     (2023.01)

(52) U.S. Cl.
   CPC .............. *G06N 3/08* (2013.01); *G06F 18/24* (2023.01); *G06F 2218/00* (2023.01)

(56) References Cited

U.S. PATENT DOCUMENTS

2019/0108444 A1    4/2019   Song et al.
2019/0354836 A1*   11/2019  Shah ..................... G06N 3/045
2019/0384983 A1    12/2019  Katoch et al.

OTHER PUBLICATIONS

Vaswani, Ashish, Noam Shazeer, Niki Parmar, Jakob Uszkoreit, Llion Jones, Aidan N. Gomez, Łukasz Kaiser, and Illia Polosukhin. "Attention is all you need." In Advances in Neural Information Processing Systems, pp. 5998-6008. 2017.
Lipton, Zachary C., David C. Kale, Charles Elkan, and Randall Wetzel. "Learning to diagnose with LSTM recurrent neural networks." arXiv preprint arXiv:1511.03677 (2015).
Bahdanau, D.; Cho, K.; and Bengio, Y. 2014. Neural machine translation by jointly learning to align and translate. arXiv preprint arXiv:1409.0473.
Bashivan, P.; Rish, I.; Yeasin, M.; and Codella, N. 2015. Learning representations from eeg with deep recurrent-convolutional neural networks. arXiv preprint arXiv: 1511.06448.
Cui, Y.; Chen, Z., Wei, S.; Wang, S.; Liu, T.; and Hu, G. 2016. Attention-over-attention neural networks for reading comprehension. arXiv preprint arXiv: 1607.04423.
Ghassemi, M.; Pimentel, M. A.; Naumann, T.; Brennan, T.; Clifton, D. A.; Szolovits, P.; and Feng, M. 2015. A multi-variate timeseries modeling approach to severity of illness assessment and forecasting in icu with sparse, heteroge-neous clinical data. In AAAI, 446-453.
Harutyunyan, H.; Khachatrian, H.; Kale, D. C.; and Galstyan, A. 2017. Multitask learning and benchmarking with clinical time series data. arXiv preprint arXiv:1703.07771.
Hermann, K. M.; Kocisky, T.; Grefenstette, E.; Espeholt, L.; Kay, W.; Suleyman, M.; and Blunsom, P. 2015. Teaching machines to read and comprehend. In Advances in Neural Information Processing Systems, 1693-1701.
Hochreiter, S., and Schmidhuber, J. 1997. Long short-term memory. Neural computation 9(8):1735-1780.
Johnson, A. E.; Pollard, T. J.; Shen, L.; Lehman, L.-w. H.; Feng, M.; Ghassemi, M.; Moody, B.; Szolovits, P.; Celi, L. A.; and Mark, R. G. 2016. MIMIC-III, a freely accessible critical care database. Scientific data 3.
Kingma, D., and Ba, J. 2014. Adam: A method for stochastic optimization. arXiv preprint arXiv:1412.6980.
Xu, K.; Ba, J.; Kiros, R.; Cho, K.; Courville, A.; Salakhudi-nov, R.; Zemel, R.; and Bengio, Y. 2015. Show, attend and tell: Neural image caption generation with visual attention. In International Conference on Machine Learning, 2048-2057.
Lipton, Z. C.; Kale, D. C.; and Wetzel, R. 2016. Modeling missing data in clinical time series with rnns. arXiv preprint arXiv:1606.04130.
Liu, Z., and Hauskrecht, M. 2013. Clinical time series prediction with a hierarchical dynamical system. In Conference on Artificial Intelligence in Medicine in Europe, 227-237. Springer.
Liu, Z., and Hauskrecht, M. 2016. Learning adaptive forecasting models from irregularly sampled multivariate clinical data. In AAAI, 1273-1279.
Paulus, R.; Xiong, C.; and Socher, R. 2017. A deep reinforced model for abstractive summarization. arXiv preprint arXiv:1705.04304.
Sutskever, I.; Vinyals, O.; and Le, Q. V. 2014. Sequence to sequence learning with neural networks. In Advances in neural information processing systems, 3104-3112.
Trask, A.; Gilmore, D.; and Russell, M. 2015. Modeling order in neural word embeddings at scale. arXiv preprint arXiv:1506.02338.
Vaswani, A.; Shazeer, N.; Parmar, N.; Uszkoreit, J.; Jones,L.; Gomez, A. N.; Kaiser, L.; and Polosukhin, I. 2017. Attention is all you need. arXiv preprint arXiv:1706.03762.
Vinyals, O.; Kaiser, Ł.; Koo, T.; Petrov, S.; Sutskever, I.; and Hinton, G. 2015. Grammar as a foreign language. In Advances in Neural Information Processing Systems, 2773-2781.
Wu, Y.; Schuster, M.; Chen, Z.; Le, Q. V.; Norouzi, M.; Macherey, W.; Krikun, M.; Cao, Y.; Gao, Q.; Macherey, K.; et al. 2016. Google's neural machine translation system: Bridging the gap between human and machine translation. arXiv preprint arXiv:1609.08144.
U.S. Appl. No. 16/739,824, Shanthamallu et al., filed Jan. 10, 2020.
U.S. Appl. No. 16/740,072, Shanthamallu et al., filed Jan. 10, 2020.
U.S. Appl. No. 16/797,281, Rao et al., filed Feb. 21, 2020.
U.S. Appl. No. 16/868,050, Rao et al., filed May 6, 2020.

* cited by examiner

SYSTEMS AND METHODS FOR TIME SERIES ANALYSIS USING ATTENTION MODELS

CROSS-REFERENCE TO RELATED APPLICATIONS

This application is a non-provisional of, and claims priority to, U.S. Provisional Application No. 62/795,176, filed Jan. 22, 2019 and entitled "TIME SERIES ANALYSIS USING ATTENTION MODELS" and which is hereby incorporated by reference in its entirety.

TECHNICAL FIELD

The present disclosure relates to machine learning and, more particularly, to systems and methods for time series analysis.

BACKGROUND

Current approaches for time series analysis, such as recurrent Neural Networks (RNNs) based on Long Short-Term Memory (LSTM) (the classic approach for time series analysis), suffer from various drawbacks. Accordingly, improved approaches remain desirable.

SUMMARY

In various embodiments, systems and methods for time series analysis using attention models are disclosed. In various embodiments, an exemplary system may capture dependencies across different variables through input embedding. An exemplary system may map the order of a sample appearance to a randomized lookup table via positional encoding. The system may capture dependencies within a single sequence through a self-attention mechanism and determine a range of dependency to consider for each position being analyzed. The system may obtain an attention weighting to other positions in the sequence through computation of an inner product. The system may utilize the attention weighting to acquire a vector representation for a position and mask the sequence to enable causality. The system may employ a dense interpolation technique for encoding partial temporal ordering to obtain a single vector representation. The system may utilize a linear layer to obtain logits from the single vector representation and use a final prediction layer whose type depends on the specific task.

In various embodiments, the self-attention mechanism is a masked multi-head mechanism. In various embodiments, the analysis and modeling of multivariate time series data is fully parallelizable. In various embodiments, the specific task is a binary classification problem and utilizes a softmax layer. In various embodiments, the specific task is a multi-label classification and utilizes a sigmoid layer. In various embodiments, the specific task is a regression problem and utilizes a rectified linear unit layer.

The contents of this section are intended as a simplified introduction to the disclosure, and are not intended to be used to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
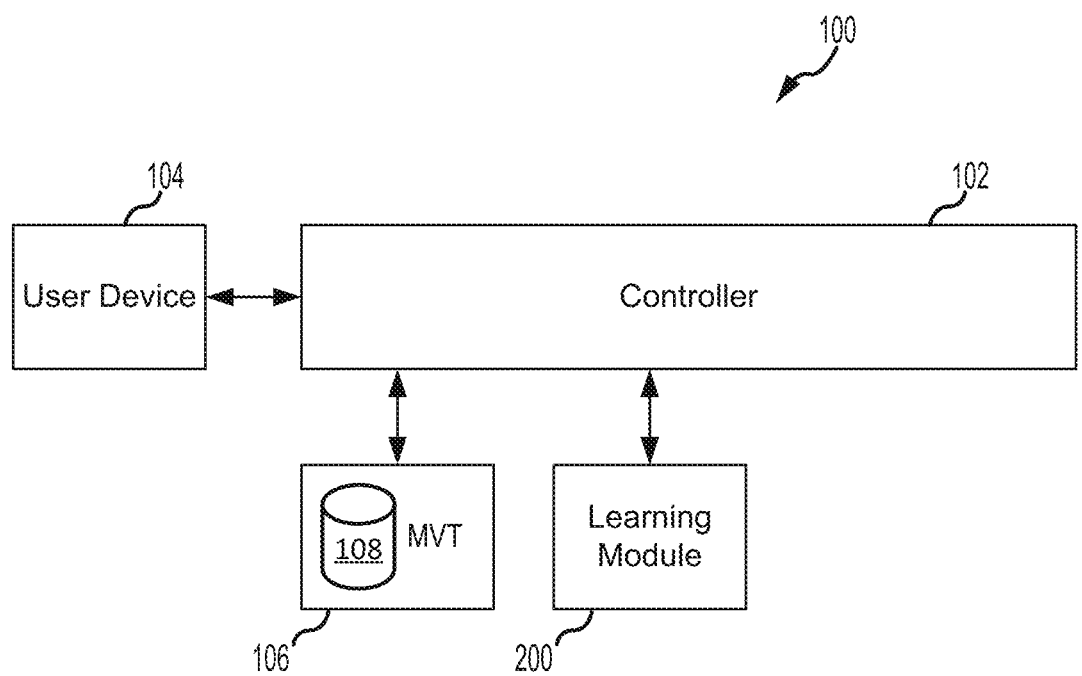
FIG. 1 is a block diagram illustrating a system for time series analysis, in accordance with various embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for data mining, machine learning, computer modeling, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical system, related methods, and/or products arising therefrom.

Healthcare is one of the prominent applications of data mining and machine learning, and it has witnessed tremendous growth in research interest recently. This can be directly attributed to both the abundance of digital clinical data, primarily due to the widespread adoption of electronic health records (EHR), and advances in data-driven inferencing methodologies. Clinical data, for example intensive care unit (ICU) measurements, is often comprised of multi-variate, time-series observations corresponding to sensor measurements, test results and subjective assessments. Potential inferencing tasks using such data include classifying diagnoses accurately, estimating length of stay, and predicting future illness, or mortality.

In accordance with various exemplary embodiments, an exemplary system may provide a greater level of sophistication and/or control for big data systems. For example, exemplary systems and methods may be utilized in connection with modeling and interpretation of healthcare data. While prior art systems typically often demand extracting hand-engineered features and building task-specific predictive models which are prohibitive of parallelized computing, exemplary systems may utilize attention models for time series modeling and, thereby, dispense with task-specific predictive models thereby enabling machine learning based on temporal order. As such, exemplary systems may use self-attention that models dependencies within a single sequence. For example, an exemplary system may enable a network based solely on attention computation and which uses positional encoding and dense interpolation to model ordering information in order to achieve predictive performance on time series data, such as speech understanding, sensor-based activity recognition, financial data modeling, healthcare data modeling, and the like. Benefits of the present disclosure may apply to processing any suitable data, for example multi-variate time-series data. For example, principles of the present disclosure may be applied in financial modeling contexts, as well as in healthcare outcome modeling and language recognition contexts.

Exemplary methods and processes disclosed herein improves the functioning of a computer system. For example, exemplary principles enable accelerated data processing. Similarly, an exemplary process increases the reliability and speed of data presentation by enabling parallel processes. In various embodiments, an exemplary system utilizes an architecture which employs a masked self-attention mechanism and uses positional encoding and dense interpolation strategies for incorporating temporal order. In this regard, by transmitting, storing, and/or accessing data using the processes described herein, the quality of the data is improved and errors are reduced. Such improvements also increase the efficiency of the network by reducing the portion of duplicated processes. In various embodiments, processing data based on the methods disclosed herein reduces back end processing and reduces processing time for data analysis. In this regard, the processes may save processing resources including CPU time, memory resources, and/or network resources.

For example, a self-attention mechanism of an exemplary system calculates the embedding for a time series in a single pass. In contrast, conventional recurrent approaches follow the sequential order of the time series in calculating the embedding. In this regard, an exemplary system according to the embodiments disclosed herein may be fully parallelized and thereby increase the processing speed of the modeling process, as compared to conventional recurrent approaches which cannot be parallelized. In various embodiments, when applied on a graphics processing unit (GPU), an exemplary system may utilize the parallelization power of the GPU to further accelerate processing of the time series modeling process. In addition, by calculating the time series embedding in a single pass, an exemplary system improves the modeling of temporal dependencies for long sequences. In contrast, conventional recurrent approaches tend to suffer from vanishing gradient issues when applied for long sequences.

In various embodiments and with reference now to FIG. 1, an exemplary system 100 may comprise a controller 102, a user device 104, a database 106, and a learning module 200. Any of these components may be outsourced and/or be in communication with controller 102 via a network. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, controller 102 may be configured as a central network element or hub to access various systems, engines, and components of system 100. Controller 102 may comprise a network, computer-based system, and/or software components configured to provide an access point to various systems, engines, and components. Controller 102 may be in operative and/or electronic communication with the user device 104, the database 106, and the learning module 200. In this regard, the controller 102 may allow communication from user device 104 and database 106 to systems, engines, and components of system 100.

In various embodiments, user device 104 may comprise software and/or hardware in communication with controller 102 via a network comprising hardware and/or software configured to allow an account owner, a user, and/or the like, access to controller 102. User device 104 may comprise any suitable device that is configured to allow a user to communicate with a network and controller 102. User device 104 may include, for example, a personal computer, personal digital assistant, cellular phone, kiosk, and/or the like and may allow a user to transmit voice communications.

In various embodiments, database 106 may include any number of data structures or data elements such as multivariate time series (MVT) data 108. MVT data 108 data may include, for example, patient data sets, sensor measurements, diagnosis data, clinical outcome data, mortality data, and/or the like. For example, in various embodiments, the MVT data 108 may include an Opportunity Activity Recognition data set (e.g., as such data set is available at archive.ics.uci.edu/ml/datasets/opportunity+activity+recognition as of the filing date hereof), a Medical Information Mart for Intensive Care (MIMIC) data set (e.g., as such data set is available at mimic.physionet.org as of the filing date hereof), and/or any other suitable data set. In various embodiments, controller 102 may process the MVT data 108 through the learning module 200. In this regard, the system 100 may process the MVT data 108 to generate task dependent predictions via the learning module 200. For example, when the MVT data 108 includes the Opportunity Activity Recognition data set, the task may be to predict an activity (e.g., clean table, toggle light, etc.) performed by a user based on sensor readings (stored as the MVT data 108) from a plurality of wearable devices. In this example, principles of the present disclosure may be utilized to improve the training efficiency and inference accuracy. In another example, when the MVT data 108 includes the MIMIC data set, the task may be to predict deterioration of patient specific organ functionality during a hospital stay. The learning module 200 may generate a predictive model based on the physiological sensor readings stored as the MVT data 108. In this regard, a predictive model generated by the learning module 200 may be used to assist in allocation of patient treatment resources in order to reduce and/or prevent organ decomposition and/or achieve improved patient treatment and/or mortality outcomes.

Figure 2:
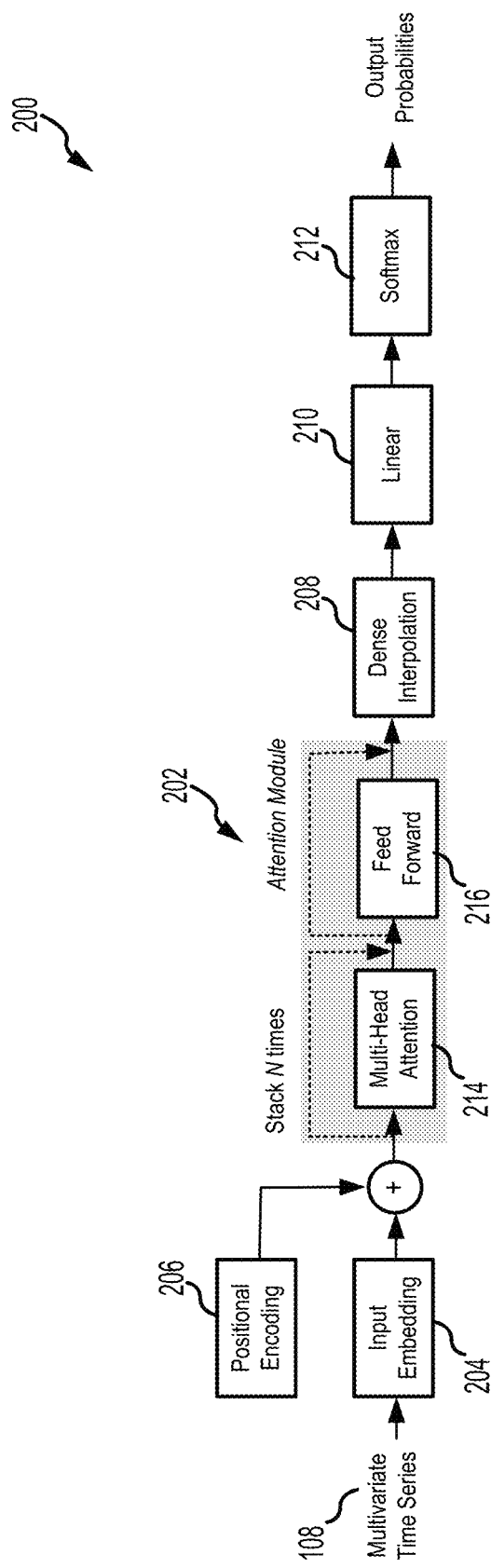
FIG. 2 is a block diagram of a learning module in a system for time series analysis, in accordance with various embodiments.

In various embodiments and with additional reference to FIG. 2, learning module 200 may include one or more sub-processing modules such as, for example, an attention module 202, an input embedding module 204, a positional encoding module 206, a dense interpolation module 208, a linear layer module 210, and a softmax layer module 212.

Controller 102 may receive the MVT data 108 from the database 106 and may pass the MVT data 108 to the learning module 200. The learning module 200 may process the MVT data 108 through the input embedding module 204. Input embedding module 204 may capture the time-dependencies across different variables without considering imbedded temporal information. Stated another way, the input embedding module 204 may determine a time dependency for each variable of the MVT data. The input embedding module 204 may map the time dependency into a high-dimensional vector space to generate a high-dimensional embedding for each time position based on a one-dimensional convolutional layer.

Positional encoding module 206 may map the MVT data 108 to a randomized lookup table to generate a positional encoding data. In this regard, positional encoding module 206 enables inclusion of information about the relative or absolute position of the time-steps in a sequence of a time dependent variable of the MVT data 108 through a positional encoding component. The positional encoding module 206 thereby enables system 100 to include information about the order of a sequence of the MVT data 108 without incorporating recurrence in the learning module 200 architecture. Stated another way, positional encoding module 206 may perform the positional encoding by mapping the order of sample appearance to a randomized lookup table.

In various embodiments, an exemplary system 100 may integrate the positional encoding data with the high-dimensional embedding to generate an integrated vector space, and the attention module 202 may process the integrated vector space. The attention module 202 includes a multi-head attention sub-layer 214 and a fully connected feed-forward network 216. The attention module 202 includes N identical layers, constructed with each layer of the N layers including an attention sub-layer 214 and a feed-forward network 216. In this regard, the attention module 202 may be stacked multiple times to establish a temporal modeling functionality based on plurality of variables of the MVT data 108.

In various exemplary embodiments, each multi-head attention sub-layer 214 of attention module 202 comprises a self-attention mechanism. The self-attention mechanisms capture dependencies of a single sequence (i.e., one for each layer). Further contemplated in the present disclosure is the use of a restricted self-attention component which may thereby impose causality. The attention module 202 may determine a range of dependency to consider for each variable and/or position of the integrated vector space under analysis, depending on the task. Additionally, in various embodiments, the attention module 202 may enable computation for each position of the inner product between the query vector at the position and the key vectors at every other position within the restricted set to obtain an attention weighting to other positions in the sequence. Stated another way, the attention module 202 may generate an attention weight based on a computed inner product of the integrated vector space, wherein the integrated vector space comprises a query vector and a key vector. Using these attention weights, a weighted computation of the value vectors is computed, and the result is passed through a feed-forward network to obtain the vector representation for that position. Stated another way, the attention module 202 may generate a vector representation based on the attention weight.

Mathematically, an attention weighting computation of the attention module 202 can be expressed as:

$$\text{Attention}(Q, K, V) = \text{softmax}\left(\frac{QK^T}{\sqrt{d}}\right)V$$

where Q, K, V are the queries, keys and values respectively, and d is the dimension of the key vectors. In this regard, system 100 generates multiple attention graphs, each of which is defined by different parameters. Each of these attention graphs may be interpreted to encode different types of edges and hence can provide complementary information about different types of dependencies within the MVT data 108.

The attention module 202 may further process the sequence via a masking operation to enable causality. For example, the sequence may be masked to specify how far the attention models can look into the past for obtaining the representation for each position. As discussed above, the attention module 202 components may be stacked multiple times, which thus performs the prediction task using representations obtained at the final attention module. Predictions are not made at each step in all cases, such that a concise representation for the entire sequence must be created using the learned representations, which is contemplated by employing a dense interpolated embedding scheme that encodes partial temporal ordering.

In various embodiments, the dense interpolation module 208 may further process the data. The dense interpolation module 208 may encode order by utilizing a dense interpolation from language modeling. In this regard, in connection with language modeling, dense interpolated embeddings provide a concise representation and improve encoded word structures, which tend to assist in detecting syntactic features. Stated another way, the dense interpolation module 208 may apply a dense interpolation technique to an attention module post-processed data to generate a single vector representation which may be passed to the linear layer module 210.

In various embodiments, the linear layer module 210 may receive the single vector representation. The linear layer module 210 may further process the single vector representation to generate a plurality of logits (i.e., raw prediction values). The linear layer module 210 may pass the logits to the softmax layer module 212.

In various embodiments, the softmax layer module 212 may receive the plurality of logits and determine, based at least in part on the logits, a prediction based on the predictive task. Stated another way, the softmax layer may be a final prediction layer of a task dependent type which may use the logits. In various embodiments, the final prediction layer includes at least one of a softmax layer (e.g., for binary classification problems), a sigmoid layer (e.g., for multi-label classification where classes are not mutually exclusive), and/or a rectified linear unit layer (e.g., for regression problems).

In various embodiments, learning module 200 may be trained. During training of learning module 200, multiple regularization strategies may be utilized. In one exemplary embodiment, dropout is applied to the output of each sub-layer in the attention module 202 prior to residual connections and the outputs are normalized. An additional dropout layer is also included after adding the positional encoding to the input embeddings. In various embodiments, attention dropout may also be performed after computing by the attention module 202 of the self-attention weights.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

In various exemplary embodiments, computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of an exemplary system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, and the like.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the exemplary systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

What is claimed is:

1. A computer-based method for analyzing and modeling a multivariate time series data based on an attention computation, the method comprising:

capturing dependencies across different variables through input embedding;

mapping an order of a sample appearance to a randomized lookup table via positional encoding;

capturing dependencies within a plurality of self-attention mechanisms, each self-attention mechanism of the plurality of self-attention mechanisms capturing dependencies within a single sequence of each self-attention mechanism;

determining a range of dependency to consider for each position being analyzed within the single sequence of each self-attention mechanism;

obtaining a plurality of attention weightings to other positions within the single sequence through computation of an inner product, each of the plurality of attention weightings obtained within the single sequence of each self-attention mechanism;

utilizing the plurality of attention weightings to acquire a plurality of vector representations for a position;

masking the single sequence of each self-attention mechanism to enable causality;

employing a dense interpolation technique for encoding partial temporal ordering to obtain a single vector representation from the plurality of vector representations;

applying a linear layer to obtain logits from the single vector representation; and applying a final prediction layer whose type depends on a specific task.

2. The method of claim 1, wherein the self-attention mechanism is a masked multi-head mechanism.

3. The method of claim 1, wherein analysis and modeling of the multivariate time series data is fully parallelizable.

4. The method of claim 1, wherein the specific task is a binary classification problem and the final prediction layer includes a softmax layer.

5. A system for analyzing and modeling a multivariate time series data based on an attention computation, comprising:

a controller; and a tangible, non-transitory memory configured to communicate with the controller, the tangible, non-transitory memory having instructions stored thereon that, in response to execution by the controller, cause the controller to perform operations comprising:

capturing, by the controller, dependencies across different variables through input embedding;

mapping, by the controller, an order of a sample appearance to a randomized lookup table via positional encoding;

capturing, by the controller, dependencies within a plurality of a self-attention mechanisms, each self-attention mechanism of the plurality of self-attention mechanisms capturing dependencies within a single sequence of each self-attention mechanism;

determining, by the controller, a range of dependency to consider for each position being analyzed within the single sequence of each self-attention mechanism;

obtaining, by the controller, a plurality of attention weightings to other positions within the single sequence through computation of an inner product, each of the plurality of attention weightings obtained within the single sequence of each self-attention mechanism;

utilizing, by the controller, the plurality of attention weightings to acquire a plurality of vector representations for a position;

masking, by the controller, the single sequence of each self-attention mechanism to enable causality;

employing, by the controller, a dense interpolation technique for encoding partial temporal ordering to obtain a single vector representation from the plurality of vector representations;

utilizing, by the controller, a linear layer to obtain logits from the single vector representation; and using, by the controller, a final prediction layer whose type depends on a specific task.

6. The system of claim 5, wherein the self-attention mechanism is a masked multi-head mechanism.

7. The system of claim 5, wherein analysis and modeling of the multivariate time series data is fully parallelizable.

8. The system of claim 5, wherein the specific task is a binary classification problem and the final prediction layer includes a softmax layer.

9. An article of manufacture including a tangible, non-transitory computer-readable storage medium having instructions stored thereon that, in response to execution by a processor, cause the processor to perform operations comprising:

capturing, by the processor, dependencies across different variables of a multivariate time series data through input embedding;

mapping, by the processor, an order of a sample appearance to a randomized lookup table via positional encoding;

capturing, by the processor, dependencies within a plurality of self-attention mechanisms, each self-attention mechanism of the plurality of self-attention mechanisms capturing dependencies within a single sequence of each self-attention mechanism;

determining, by the processor, a range of dependency to consider for each position being analyzed within the single sequence of each self-attention mechanism;

obtaining, by the processor, a plurality of attention weightings to other positions within the single sequence through computation of an inner product, each of the plurality of attention weightings obtained within the single sequence of each self-attention mechanism;

utilizing, by the processor, the plurality of attention weightings to acquire a plurality of vector representations for a position;

masking, by the processor, the single sequence of each self-attention mechanism to enable causality;

employing, by the processor, a dense interpolation technique for encoding partial temporal ordering to obtain a single vector representation from the plurality of vector representations;

utilizing, by the processor, a linear layer to obtain logits from the single vector representation; and using, by the processor, a final prediction layer whose type depends on a specific task.

10. The article of manufacture of claim 9, wherein the self-attention mechanism is a masked multi-head mechanism.

11. The article of manufacture of claim 9, wherein the operations by the processor are fully parallelizable.

12. The article of manufacture of claim 9, wherein the specific task is a binary classification problem and the final prediction layer includes a softmax layer.

* * * * *